United States Patent [19]
Chandrasekhar

[11] Patent Number: 5,577,139
[45] Date of Patent: Nov. 19, 1996

[54] INTEGRATED-CIRCUIT OPTICAL NETWORK UNIT

[75] Inventor: S. Chandrasekhar, Matawan, N.J.

[73] Assignee: Lucent Technologies Inc., Murray Hill, N.J.

[21] Appl. No.: 516,418

[22] Filed: Aug. 17, 1995

[51] Int. Cl.$^6$ .............................. G02B 6/12; H04B 10/00
[52] U.S. Cl. ................... 385/14; 385/24; 385/31; 385/39; 385/49; 385/1; 385/2; 385/131; 359/154; 359/173
[58] Field of Search .................................. 385/14, 15, 24, 385/27, 31, 39, 49, 50, 129, 130, 131, 1, 2, 4, 8, 40; 359/154, 173, 245, 333, 341

[56] References Cited

U.S. PATENT DOCUMENTS

| | | | |
|---|---|---|---|
| 4,997,246 | 3/1991 | May et al. | 385/2 X |
| 5,005,933 | 4/1991 | Shimuzu | 385/2 X |
| 5,105,433 | 4/1992 | Eisele et al. | 372/50 |
| 5,117,469 | 5/1992 | Cheung et al. | 385/11 |
| 5,134,671 | 7/1992 | Koren et al. | 385/14 |
| 5,191,625 | 3/1993 | Gustavsson | 385/14 |
| 5,208,878 | 5/1993 | Thulke | 385/14 |
| 5,369,719 | 11/1994 | Mishima et al. | 385/48 |
| 5,402,259 | 3/1995 | Lembo et al. | 359/245 |
| 5,428,695 | 6/1995 | Ohta | 385/14 |
| 5,479,539 | 12/1995 | Goldsmith et al. | 385/14 |
| 5,502,779 | 3/1996 | Magel | 385/1 |

OTHER PUBLICATIONS

S. Chandrasekhar, "The Progress & Performance of Long Wavelength OEIC Photoreceivers Incorporating Heterojunction Bipolar Transistors", 1994, pp. 45–65, Int'l Journal of High Speed Electronics & Systems, vol. 5, No. 1.

Primary Examiner—Brian Healy

[57] ABSTRACT

An optical network unit designed to be connected to incoming and outgoing fibers at a customer location is made in integrated-circuit form. One portion of the integrated circuit functions as an optical splitter, a photodetector and a modulator. Another portion of the circuit serves as an amplifier.

12 Claims, 4 Drawing Sheets

INTEGRATED-CIRCUIT OPTICAL NETWORK UNIT

BACKGROUND OF THE INVENTION

This invention relates to a communication system utilizing optical fibers and, more particularly, to a unit that functions as an interface between incoming and outgoing fibers and individual customers connected to the system.

Due primarily to their low-loss and high-bandwidth characteristics, optical fibers are utilized in a wide variety of communication systems of practical importance. For some time, such utilization has been seen as particularly attractive in long-haul systems. Although relatively expensive terminal equipment is typically required in a long-haul system, the cost of the equipment is in effect shared by tens of thousands of individual customers served by the system.

More recently, considerable development effort has been directed at trying to devise economical optical-fiber systems capable of delivering broadband signals (for example, voice, data and video) directly to customer premises. One such approach involves running optical fiber from a central office to each customer location and providing a so-called optical network unit between the fiber and the customer. An incoming optical signal can be thereby constantly applied from the central office to each network unit. In each unit, the incoming optical signal is split into two portions. One portion is detected and then applied as an electrical signal to the customer equipment. Another portion of the incoming optical signal is modulated with electrical signals from the customer and then sent in the form of an outgoing optical signal back to the central office.

Significantly, the aforedescribed optical network unit does not require an optical source such as a laser. The only optical source in the overall system is typically located in the central office. Accordingly, the need for wavelength control and timing accuracy at each customer location is thereby obviated.

Nevertheless, optical network units as heretofore envisioned are relatively large and costly. A straightforward approach to the design of such a unit that includes an optical splitter, a photodetector, a modulator and an electrical amplifier involves simply interconnecting conventional discrete components. The resulting multi-component unit, however, is typically relatively bulky and expensive and requires, for example, four fiber connectors and three electrical connectors.

Accordingly, considerable efforts have been directed by workers skilled in the art aimed at attempting to develop an optical network unit that is characterized by relatively low cost, compactness, simplicity and reliability. It was recognized that these efforts, if successful, could provide an important practical basis for achieving economical broadband service to individual customers.

SUMMARY OF THE INVENTION

In accordance with the principles of the present invention, an optical network unit designed to be connected to incoming and outgoing fibers at a customer location is made in integrated-circuit form in a batch-fabrication process. One portion of the integrated circuit comprises a multi-layered monolithic structure that functions as an optical splitter, a photodetector and a modulator. A second spaced-apart portion of the same integrated-circuit comprises only some of the layers included in the first-mentioned portion. This second portion functions as an amplifier for electrical signals generated by the photodetector. In that way, electrical signals representative of incoming information can be supplied to each customer. Further, electrical signals from each customer can be utilized to modulate that part of the incoming optical signal that is routed back to the outgoing fiber via the modulator in the optical network unit.

BRIEF DESCRIPTION OF THE DRAWING

A complete understanding of the present invention and of the above and other features and advantages thereof may be gained from a consideration of the following detailed description presented hereinbelow in connection with the accompanying drawing, not drawn to scale, in which.

DETAILED DESCRIPTION

Figure 1:
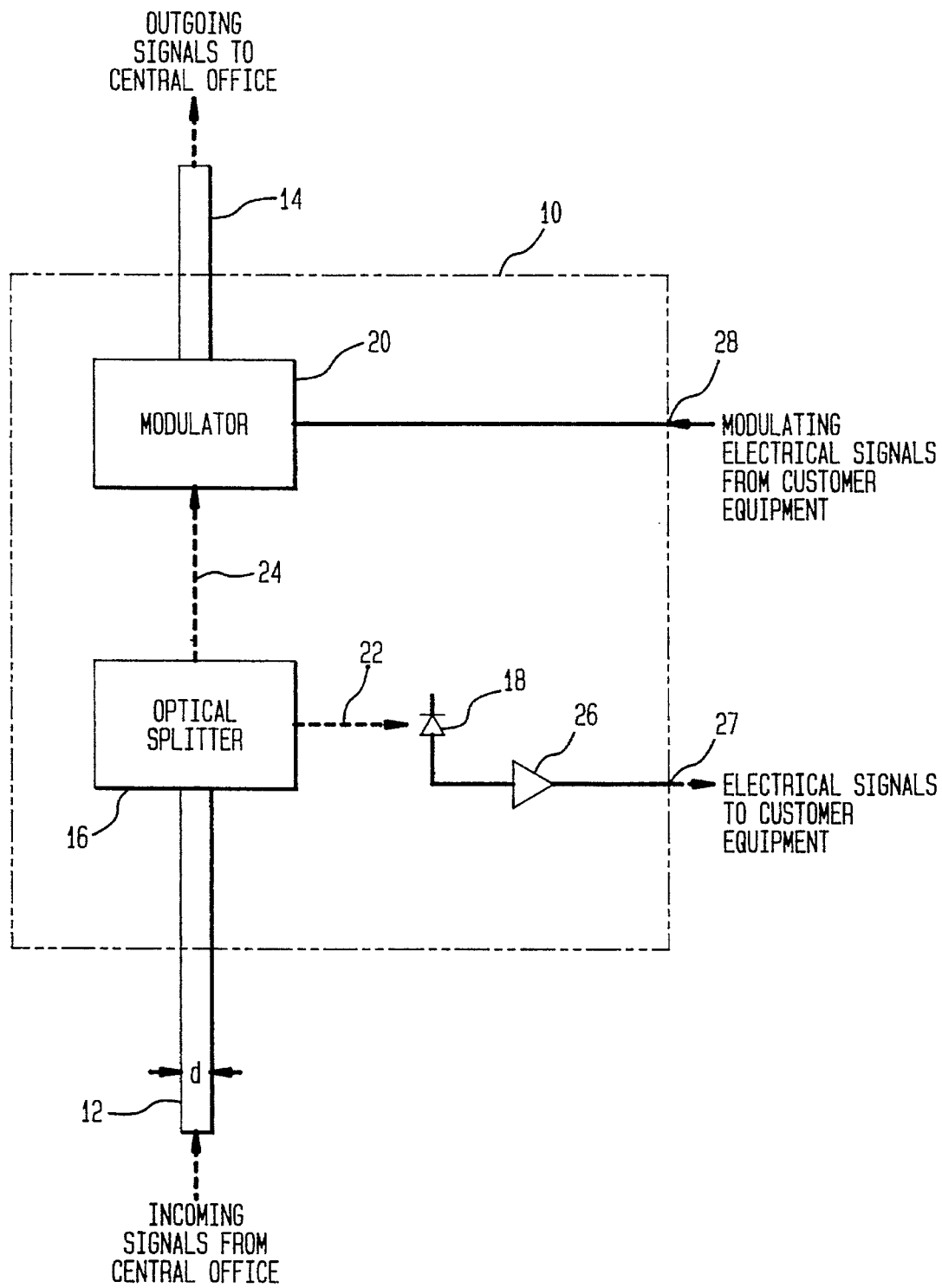
FIG. 1 is a schematic representation of a known type of optical network unit to which the principles of the present invention are applicable.

A simplified schematic depiction of a conventional optical network unit is shown in FIG. 1 within dash-line box 10. Incoming optical signals from, for example, a central office are applied to the unit 10 via an input optical fiber 12. Outgoing optical signals from the unit 10 are propagated via an output optical fiber 14. Illustratively, the fibers 12 and 14 are conventional single-mode fibers made, for example, of doped silica glass. The overall diameter d of each such fiber is, for example, about 125 micrometers ($\mu m$). Advantageously, the carrier frequency of the incoming and outgoing optical signals is centered at a wavelength of 1.55 $\mu m$, which is the lowest-loss wavelength of such conventional fibers.

Incoming optical signals on fiber 12 of FIG. 1 are applied to a conventional optical splitter 16. One portion of the incoming signal (for example, about ninety percent) is directed by the splitter 16 to a standard photodetector 18 (represented as a p-n photodiode), while the remaining portion of the incoming signal is routed by the splitter 16 to a modulator 20. Dash lines 22 and 24 respectively represent the propagation of optical signals from the splitter 16 to the photodetector 18 and to the modulator 20.

The photodetector 18 of FIG. 1 provides an electrical output signal which is applied to an amplifier 26. In turn, the output of the amplifier 26 is applied via electrical lead 27 to standard customer equipment such as, for example, telephone, computer or television equipment. In that way, any information impressed on the optical carrier at the central office is detected in the unit 10 and then delivered to the customer.

On the other hand, information in the form of electrical signals that the customer wishes to transmit to the central office is applied to the modulator 20 of FIG. 1 via electrical lead 28. In the modulator 20, a portion of the incoming optical signal (represented by the dash line 24) is selectively altered in accordance with the electrical signals on the lead 28. As a result, a modulated version of that portion of the incoming optical signal is applied by the modulator 20 to the fiber 14 for propagation to the central office.

In accordance with the principles of the present invention, the entire unit 10 of FIG. 1 is fabricated as an integrated-circuit structure. Illustratively, such a structure is made by initially depositing, layer by layer, the specific multi-layered arrangement shown in FIG. 2. Then, by following conventional lithographic, etching, metal-deposition and other standard steps well known in the semiconductor processing art, the FIG. 2 arrangement is processed to form the particular illustrative unit represented in FIG. 3. As will be described in detail below, the integrated-circuit unit contained within the dash-line box 30 of FIG. 3 is functionally equivalent to the aforespecified unit 10 shown in FIG. 1.

Figure 3:
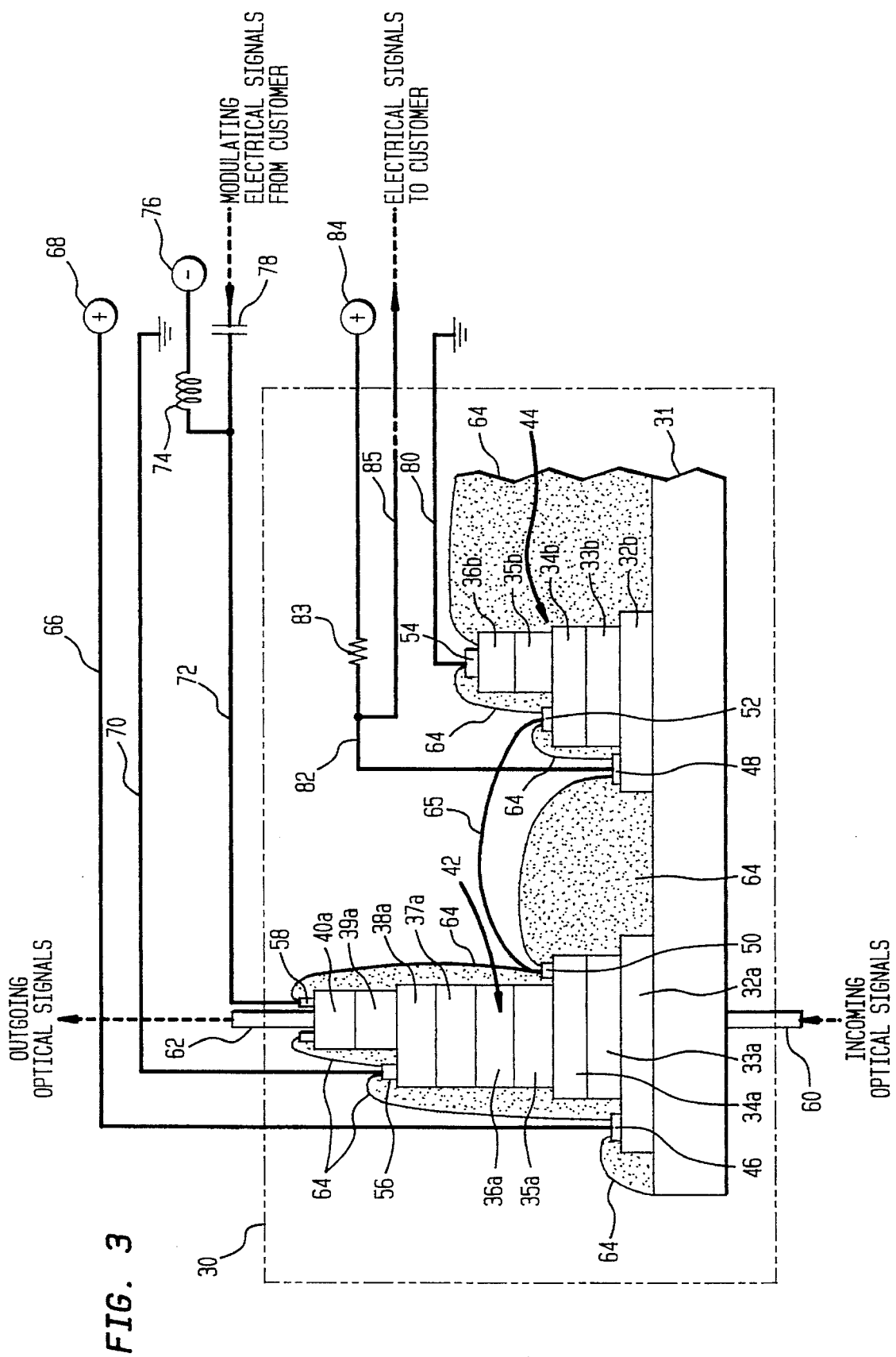
FIG. 3 shows the FIG. 2 structure after being processed in accordance with the invention.

Significantly, in the integrated-circuit unit 30 shown in FIG. 3, the optical splitting function is in effect performed by the photodetecting portion of the structure. By absorbing some of the incident optical signal and thus permitting only a remaining portion thereof to propagate in the depicted structure, the photodetector performs both functions of the individual discrete components 16 and 18 shown in FIG. 1. No separate and distinct optical splitter element, as shown in FIG. 1, is required in FIG. 3. Clearly, therefore, the FIG. 3 unit, while functionally equivalent to the FIG. 1 arrangement, is not simply a component-by-component integrated-circuit substitution therefor.

Figure 2:
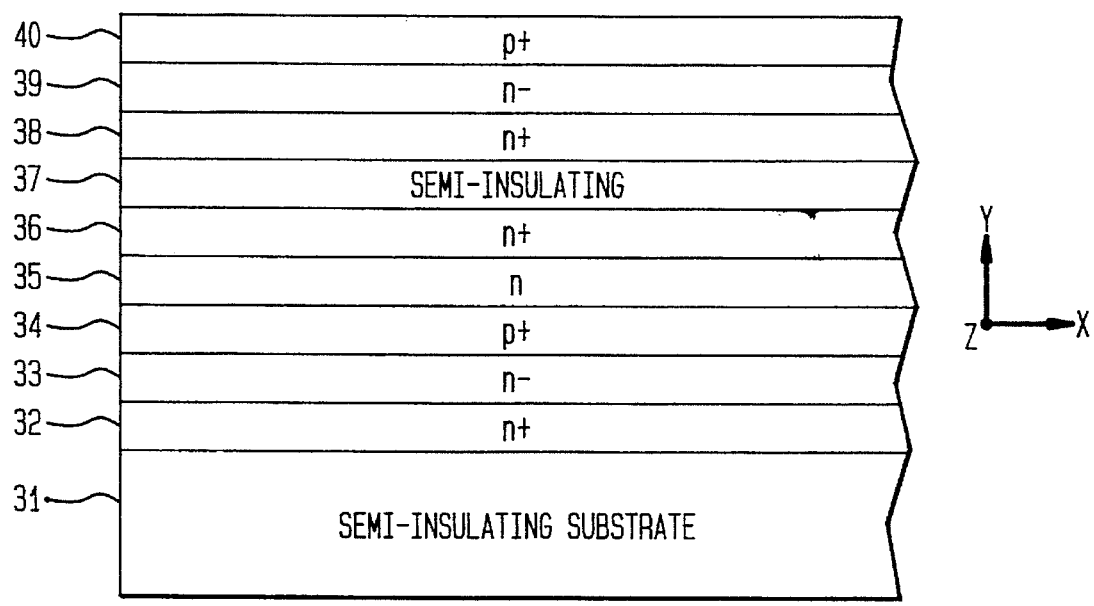
FIG. 2 is a cross-sectional view of a multi-layered structure from which, in accordance with the invention, the individual components of FIG. 1 are to be made in integrated-circuit form.

Illustratively, the FIG. 2 structure comprises nine epitaxial layers deposited in sequence on the planar top surface of a standard semi-insulating substrate 31 that comprises a wafer made, for example, of indium phosphide (InP). The substrate 31, which, for example, has a Y-direction thickness of about 200-to-400 μm, is substantially transparent to optical signals at 1.55 μm. In the completed device, incoming optical signals will be directed substantially perpendicular to the bottom X-Z planar surface of the substrate 31.

By way of a specific illustrative example, the first layer deposited on the top X-Z planar surface of the substrate 31 of FIG. 2 comprises an $n^+$-doped layer 32 of InP about 0.5 μm thick. The layer 32 serves as an electrical contact layer for overlying layer 33. In turn, the layer 33 is made of a material that is designed to absorb a specified portion of the incoming optical signal propagated through the substrate 31 and the layer 32. In one particular illustrative case, the layer 33 is about two μm thick and is made of $n^-$-doped indium gallium arsenide having the particular composition $In_{0.53}Ga_{0.47}As$. Such a layer is characterized by absorbing about ninety percent of the incoming optical signal and transmitting about ten percent of that signal to overlying layer 34.

Illustratively, the layer 34 of FIG. 2 comprises an electrical contact layer made of $p^+$-doped $In_{0.53}Ga_{0.47}As$ which, with the layers 32 and 33, forms a p-n photodiode for detecting the incoming optical signal and generating an electrical signal in response thereto. Electrical contacts will later be made to the contact layers 32 and 34, and leads will be respectively connected thereto, to abstract an electrical signal from the indicated photodetector and to apply the signal to an associated amplifier (such as the amplifier 26 of FIG. 1).

Overlying the layer 34 of FIG. 2 are, in order, n-doped layer 35 and $n^+$-doped layer 36. Illustratively, these layers are each made of optically transparent InP. The layer 35 is, for example, about 0.1 μm thick, and the layer 36 is, for example, approximately 0.05 μm thick. In one portion of the integrated circuit that will be fabricated from the FIG. 2 structure, the layers 35 and 36 serve to isolate the aforedescribed photodetector from a modulator to be defined in as-yet-unspecified overlying layers.

In another portion of the integrated circuit to be fabricated from the FIG. 2 structure, the n-type layer 35 will constitute the emitter region of one or more conventional heterojunction bipolar transistors, and the layer 36 will constitute an emitter contact region. Further, in that other or transistor portion of the integrated circuit, the $p^+$-type layer 34 will constitute the base region of the transistor, and the $n^-$-type layer 33 will constitute the collector region of the transistor. In the transistor, the $n^+$-type layer 32 will serve as a collector contact region.

In the completed integrated circuit (FIG. 3), the remaining layers of FIG. 2 that overlie the layer 36 are utilized in effect to define the modulator 20 (FIG. 1), to complete the definition of the optical splitter 16 (FIG. 1), and to further isolate the photodetector and the modulator from each other. These remaining layers will not, however, be employed in the aforespecified other or second-mentioned portion of the integrated circuit. All the layers required therein for the above-described transistor(s) already exist once the layer 36 has been deposited. Thus, all layers above the layer 36 in the other or transistor portion to be formed from the FIG. 2 structure will simply be etched away from that portion during processing.

Next, a semi-insulating optically transparent layer 37 (FIG. 2) made, for example, of InP about one μm thick is deposited on the layer 36. In the final device structure, the layer 37 will serve as a relatively high-valued resistor (having, for example, a value of about one million Ohms) which serves further to isolate the herein-described modulator and photodetector.

Subsequently, an $n^+$-type optically transparent layer 38 made, for example, of InP about 0.5 μm thick is deposited on the layer 37 of FIG. 2. The layer 38 serves as a contact layer for a modulator to be defined in the FIG. 2 structure.

Lastly, layers 39 and 40 are deposited to complete the FIG. 2 structure. The layer 40, which comprises a $p^+$-type optically transparent contact for the modulator, is made, for example, of InP and is about 0.2 μm thick. The layer 39 comprises an $n^-$-type material that, in conjunction with the layers 38 and 40, functions in effect as a transverse p-n junction diode modulator.

The layer 39 of FIG. 2 is made of a semiconductor material whose band edge shifts as a function of applied electric field. Illustratively, the material of the layer 39 is selected such that, in the absence of an applied electric field, the layer 39 absorbs relatively little of any 1.55-μm optical signal propagated upward through the FIG. 2 structure. Accordingly, under that condition, whatever portion of the incoming signal traverses the aforementioned photodetector will also be emitted from the top surface of the layer 40 of the FIG. 2 structure.

On the other hand, the layer 39 of FIG. 2 is designed to absorb most of any upwardly propagating 1.55-μm optical signal when a Y-direction electric field of at least a specified value is applied across the layer 39. In that case, virtually no optical signal is emitted from the top of the FIG. 2 structure.

Various suitable materials are available for making the layer 39. One specific illustrative such material is $n^-$-doped $In_{0.65}Ga_{0.35}As_{0.7}P_{0.3}$ about one-to-two μm thick.

Electrical contacts will later be made to the contact layers 38 and 40 of FIG. 2. And electrical leads will be respectively connected to those contacts. By means of those leads, electrical information signals from customer equipment can be thereby utilized to modulate an outgoing optical signal transmitted from the herein-considered optical network unit.

Layer by layer, the multi-layered structure of FIG. 2 is then processed in conventional ways known in the integrated-circuit art to form an optical network unit that embodies the principles of the present invention. By such standard techniques, the FIG. 2 structure is processed to make the unit 30 represented in FIG. 3. As stated earlier above, the integrated-circuit unit 30 is functionally equivalent to the unit 10 of FIG. 1.

In practice, a multi-layered wafer having the structure of FIG. 2 is advantageously processed to simultaneously form multiple optical network units during a single processing sequence. Multiple relatively low-cost and robust solid-state units can thus be made by such a batch-fabrication process.

Step by step, from top to bottom, each of the layers 32 through 40 of FIG. 2 is patterned to make in a first portion thereof on the substrate 31 a device 42 and, in the same integrated-circuit processing sequence, in a second portion thereof on the substrate 31 at least one device 44 that is spaced apart from the device 42. In effect, the device 42 constitutes the optical splitter 16, the modulator 20 and the photodetector 18 shown in FIG. 1. And the device 44 constitutes in effect the amplifier 26 shown in FIG. 1.

In practice, the amplifier 26 of FIG. 1 may actually include, for example, multiple series-connected individual bipolar transistors of the particular type discussed earlier above. Herein, for the sake of simplicity, only one such transistor is explicitly depicted in FIG. 3. However, as described in detail later below, multiple individual transistors each of the type of the device 44 may be fabricated on the substrate 31 and interconnected to form the amplifier 26.

For ease in establishing a correspondence between FIGS. 2 and 3, each of the layers 32 through 40 of FIG. 2 retains its reference number in FIG. 3 even after having been patterned to form elements of the devices 42 and 44. In FIG. 3 a letter (a) has been added to the retained number to signify that that portion of a particular layer is a part of the device 42, whereas another letter (b) has been added to the retained number to indicate that that portion of a particular layer is a part of the device 44.

Thus, for example, after being processed, the layer 32 of FIG. 2 includes at least two parts. One part 32a constitutes the n⁺-doped contact layer of the photodetector included in the device 42, whereas the other part 32b constitutes the n⁺-doped contact layer for the collector of the n-p-n bipolar transistor embodied in the device 44.

The additional layers of the device 42 of FIG. 3 are denoted with the respective designations 33a through 40a. Similarly, the additional layers of the device 44 of FIG. 3 are denoted by 33b through 36b, respectively.

In conventional ways well known in the art, metallic contacts are then made to the patterned portions of specified layers of the devices 42 and 44 of FIG. 3. Subsequently, the entire structure on the substrate 31 is overlaid with a suitable dielectric material such as a standard polyimide. The dielectric material is then etched to open windows directly overlying the metallic contacts. And conductive interconnect lines are then defined on the surface of the dielectric material to extend to specified points both within and outside of the unit 30.

Specifically, metallic contacts are formed on the following layers of the devices 42 and 44: 32a, 32b, 34a, 34b, 36b, 38a and 40a. The contacts respectively formed on the layers 32a, 32b, 34a, 34b, 36b, 38a and 40a are designated 46, 48, 50, 52, 54, 56 and 58 (58 is, for example, a ring-shaped contact). Advantageously, for the p⁺-doped layers 34a, 34b and 40a, the metallic contacts 50, 52 and 58 respectively formed thereon are, for example, standard gold/zinc-gold two-layer contact structures. And, for the n⁺-doped layers 32a, 32b, 36b and 38a, the metallic contacts 46, 48, 54 and 56 respectively formed thereon are, for example, standard gold/germanium-gold two-layer contact structures.

Illustratively, optical fiber stub 60, which is disposed in close proximity to and with its longitudinal axis approximately perpendicular to the bottom planar surface of the optically transparent substrate 31, is utilized in the FIG. 3 arrangement to launch incoming optical signals into the device 42. Similarly, another optical fiber stub 62, which is disposed in close proximity to and with its longitudinal axis approximately perpendicular to the top surface of the topmost layer 40a, is employed to carry outgoing optical signals from the device 42.

The incoming optical signal propagating through the layers 32a, 33a and 34a constituting the photodetector of the device 42 of FIG. 3 causes an electrical signal to be generated. This signal is applied to the base contact 52 of the device 44 by an electrical interconnect line which in FIG. 3 is represented simply as a lead 65. (In practice, the lead 65 and the other leads emanating from the depicted contacts constitute, for example, standard interconnect lines formed on the surface of the polyimide layer 64 by patterning a layer of a suitable material such as chromium/gold.) Illustratively, the other photodetector contact 46 is connected via electrical interconnect line 66 to a direct-current bias supply 68 having a value of, for example, about +5 volts.

The modulator contact 56 shown in FIG. 3 is connected via interconnect line 70 to a point of reference potential such as ground. And the modulator contact 58 is connected via interconnect line 72 and an inductor 74 to a direct-current bias supply 76 having a value, for example, which is between −5 and −10 volts. As indicated in FIG. 3, the modulator contact 58 is also connected via a capacitor 78 to receive modulating electrical signals from customer equipment.

As mentioned earlier above, the electrical signal generated by the photodetector portion of the device 42 of FIG. 3 is applied to the base contact 52 of the transistor device 44. Further, the emitter contact 54 of the device 44 is connected via interconnect line 80 to ground. And the collector contact 48 is connected via interconnect line 82 and resistor 83 to a direct-current bias supply 84 having a value, for example, between about +3 and +5 volts. Additionally, the collector contact 48 is typically connected via interconnect line 85 to the base of another transistor identical to the device 44. After being amplified by a series of such identical transistors, the signal appearing at the collector of the last transistor in the series is applied to customer equipment, as indicated in FIG. 3.

In practice, the resistor 83 shown in FIG. 3, as well as the other collector resistors in the series-connected chain of transistors, advantageously comprise. For example, resistive elements formed on the surface of the polyimide layer 64. Illustratively, these elements are patterned from a standard layer of nickel/chromium deposited on the layer 64.

Figure 4:
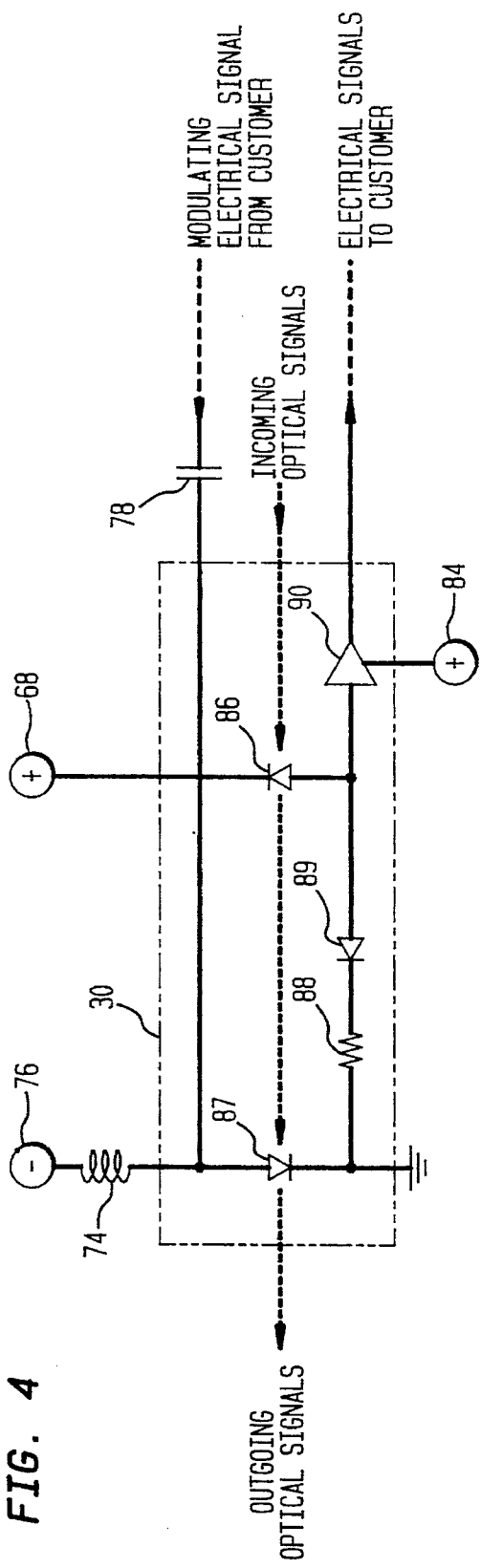
FIG. 4 is an electrical equivalent circuit of the FIG. 3 structure.

FIG. 4 is an electrical equivalent circuit of the optical network unit 30 shown in FIG. 3. Previously described bias supplies 68, 76 and 84, as well as components 74 and 78, all of which are typically located external to the unit 30, are also depicted in FIG. 4. Photodetector diode 86 of FIG. 4 represents the p-n junction formed between the layers 33a and 34a of FIG. 3. Modulator diode 87 of FIG. 4 represents the p-n junction formed between the layers 39a and 40a of FIG. 3. Resistor 88 of FIG. 4 represents the electrical resistance of the semi-insulating layer 37a. Isolation diode 89 represents the p-n junction formed between the layers 34a and 35a of FIG. 3. And amplifier 90 represents the device 44 (and any other transistors) included in FIG. 3.

Advantageously, an integrated-circuit optical network unit of the illustrative type described herein can be made and packaged in a relatively low-cost and robust manner. Thus, for example, as schematically depicted in simplified form in FIG. 5, housing 91 is assumed to contain therein an integrated-circuit unit 30 of the particular type depicted in FIG. 3. (The unit 30 and fiber stubs 60 and 62 contained within the housing are represented in dash-line outline in FIG. 5.) By means, for example, of conventional rotary optical connectors 92 and 93, input and output fibers 94 and 95 are respectively connected to connector portions mounted on the housing 91. In turn, the optical fiber stubs 60 and 62 are also connected to portions of the connectors 92 and 93 mounted on the housing 91. The stubs are thereby positioned in aligned registry with the fibers 94 and 95.

Figure 5:
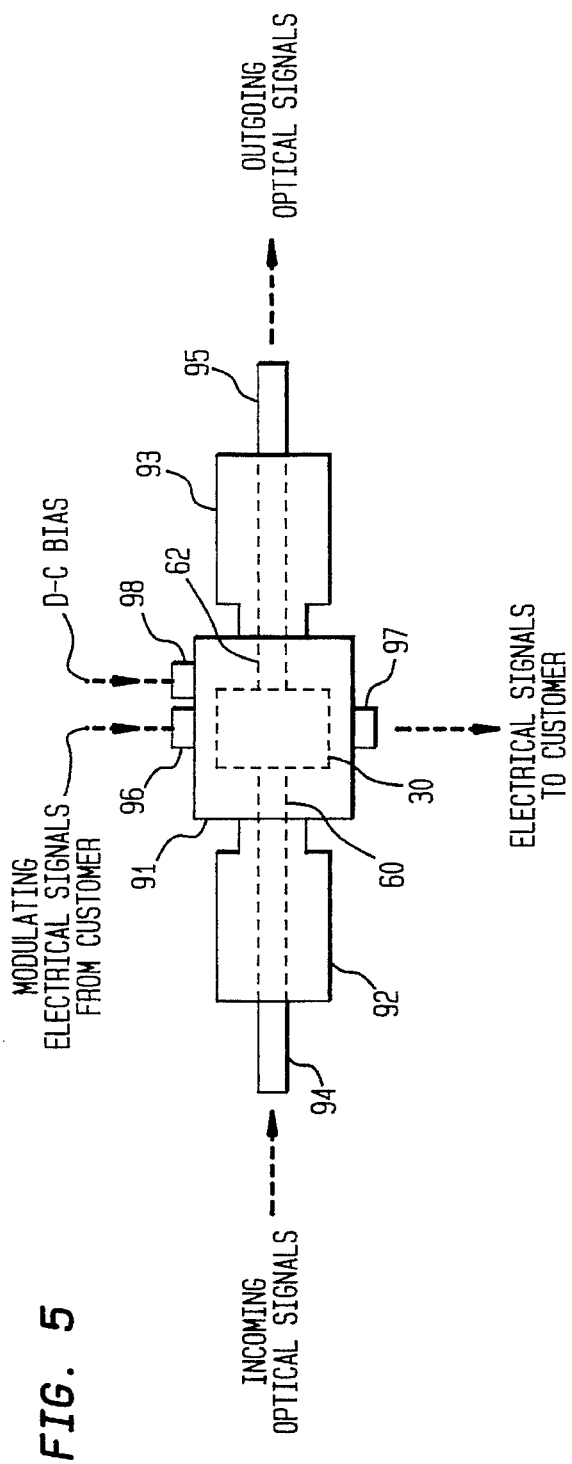
FIG. 5 illustrates a specific manner in which the FIG. 3 arrangement can be packaged in a simple module.

FIG. 5 also indicates electrical connectors 96 and 97 mounted on the housing 91. By means of the connector 96, modulating signals are applied from customer equipment to the unit 30 contained in the housing 91 (specifically, to the contact 58 of the device 42 shown in FIG. 3). By means of the connector 97, electrical signals from the unit 30 in the housing 91 (specifically, from the collector contact 48 of the device 44 of FIG. 3) are applied to customer equipment. Lastly, another electrical connector 98 is utilized to connect the various bias supplies 68, 76 and 84 to the unit 30 contained within the housing 91.

Thus, in accordance with the principles of the present invention, a relatively compact, robust and low-cost integrated-circuit optical network unit is provided. The availability of such units significantly facilitates realization of a communication system in which optical signals can be delivered to and received from individual customers.

Finally, it is to be understood that the above-described arrangements and techniques are only illustrative of the principles of the present invention. In accordance with these principles, numerous modifications and alternatives may be devised by those skilled in the art without departing from the spirit and scope of the invention. A commonly owned application designated S. Chandrasekhar- A. G. Dentai Case 3-14 (U.S. patent application Ser. No. 08/516,472), pending, directed to a related embodiment, is being filed herewith.

What is claimed is:

1. An optical network unit comprising
   an optically transparent substrate having planar top and bottom surfaces,
   a first multi-layered integrated-circuit structure on one portion of the top surface of said substrate, said multi-layered structure including, from bottom to top, first and second sets of layers,
   a second multi-layered integrated-circuit structure on another portion of the top surface of said substrate, said second multi-layered structure constituting an amplifier and comprising a set of layers that correspond to the layers in said first set of layers,
   said first multi-layered structure comprising a first photodetecting and optical-signal-splitting section responsive to any incoming optical signal directed into said first structure via a portion of the bottom planar surface of said substrate underlying said first structure for absorbing a portion of the directed signal and generating an electrical signal in response thereto while allowing the remaining unabsorbed portion of any directed signal to propagate through said first structure,
   said first multi-layered structure also comprising a second modulating section responsive to applied electrical signals for modulating said remaining unabsorbed portion of any optical signal propagated through said first structure, any optical signal that propagates through the entirety of said first multi-layered structure being designed to be emitted from the top surface of the top-most layer of said first multi-layered structure,
   means electrically connecting said first section to said amplifier,
   and means for applying electrical signals to said second section.

2. A unit as in claim 1 further comprising input optical fiber means for coupling incoming optical signals into said first multi-layered structure, and output optical fiber means for abstracting from said first multi-layered structure any optical signals that are emitted therefrom.

3. A unit as in claim 2 wherein
   said input optical fiber means comprises an incoming-signal optical fiber stub that has a main longitudinal axis and includes input and output ends, said output end being disposed in close proximity to the bottom planar surface of said substrate and underlying said first multi-layered structure, and said main longitudinal axis being disposed substantially perpendicular to said bottom planar surface,
   and said output optical fiber means comprises an outgoing-signal optical fiber stub that has a main longitudinal axis and includes input and output ends, said input end of said outgoing-signal stub being disposed in close proximity to the top surface of the top-most layer of said first multi-layered structure, and said main longitudinal axis of said outgoing-signal stub being disposed substantially colinearly with the main longitudinal axis of said incoming-signal stub.

4. A unit as in claim 2 wherein said first section comprises adjacent layers forming a p-n photodiode.

5. A unit as in claim 4 wherein said second section comprises adjacent layers forming a transverse p-n diode modulator.

6. A unit as in claim 5 wherein said amplifier comprises at least one heterojunction bipolar transistor.

7. A unit as in claim 6 further including means, comprising layers in said first multi-layered structure interposed between the layers forming a p-n photodiode and the layers forming a p-n modulator, for providing electrical isolation between said first and second sections.

8. A unit as in claim 7 wherein the adjacent layers forming a p-n photodiode include an $n^-$-doped layer of $In_{0.53}Ga_{0.47}As$ and a $p^+$-doped layer of $In_{0.53}Ga_{0.47}As$.

9. A unit as in claim 8 wherein the adjacent layers forming a p-n modulator include an $n^-$-doped layer of $In_{0.65}Ga_{0.35}As_{0.7}P_{0.3}$.

10. A unit as in claim 9 further including means for applying electrical signals from said amplifier to customer equipment.

11. A unit as in claim 3 wherein said input optical fiber means further comprises an incoming-signal optical fiber, and means for connecting said incoming-signal optical fiber to the input end of said incoming-signal optical fiber stub.

12. A unit as in claim 11 wherein said output optical fiber means further comprises an outgoing-signal optical fiber, and means for connecting said outgoing-signal optical fiber to the output end of said outgoing-signal optical fiber stub.

* * * * *